No. 626,774. Patented June 13, 1899.
W. N. SEVERANCE.
NAIL CUTTING MACHINE.
(Application filed July 9, 1898.)

(No Model.) 6 Sheets—Sheet I.

Fig. 1.

Witnesses:
R. J. Jaeker.
Allan A. Murray

Inventor:
Wm. N. Severance,
By Coburn, Shibben & McElroy
Attys.

No. 626,774. Patented June 13, 1899.
W. N. SEVERANCE.
NAIL CUTTING MACHINE.
(Application filed July 9, 1898.)
(No Model.) 6 Sheets—Sheet 3.

Fig. 3.

Witnesses:
R. J. Jacker.
Allan A. Murray.

Inventor:
Wm. N. Severance,
By Coburn, Hibben & McElroy
Attys.

No. 626,774. Patented June 13, 1899.
W. N. SEVERANCE.
NAIL CUTTING MACHINE.
(Application filed July 9, 1898.)
(No Model.) 6 Sheets—Sheet 4.

No. 626,774. Patented June 13, 1899.
W. N. SEVERANCE.
NAIL CUTTING MACHINE.
(Application filed July 9, 1898.)

(No Model.) 6 Sheets—Sheet 5.

No. 626,774. Patented June 13, 1899.
W. N. SEVERANCE.
NAIL CUTTING MACHINE.
(Application filed July 9, 1898.)
(No Model.) 6 Sheets—Sheet 6.

Witnesses: Inventor:
R. J. Jacker, Wm. N. Severance,
Allan A. Murray By Coburn, Hibben & McElroy
Attys.

THE NORRIS PETERS CO., PHOTO-LITHO., WASHINGTON, D. C.

UNITED STATES PATENT OFFICE.

WILLIAM N. SEVERANCE, OF CHICAGO, ILLINOIS, ASSIGNOR OF THIRTY-THREE FIFTIETHS TO JOHN J. BRYANT AND OLE OWEN, OF SAME PLACE.

NAIL-CUTTING MACHINE.

SPECIFICATION forming part of Letters Patent No. 626,774, dated June 13, 1899.

Application filed July 9, 1898. Serial No. 685,474. (No model.)

*To all whom it may concern:*

Be it known that I, WILLIAM N. SEVERANCE, a citizen of the United States, residing at Chicago, in the county of Cook and State of Illinois, have invented certain new and useful Improvements in Nail-Cutting Machines, of which the following is a specification.

My invention relates to that class of nail-cutting machines adapted to produce chisel-pointed nails or nails ordinarily tapering and in which the point of one nail is complementary to and lies adjacent to the head of the next nail, from which it is separated by a shearing stroke of cutters. In cutting nails of this type if one cutting-cutter coöperates with a bed-plate cutter continuously upon the same nail-strip it is necessary to turn the strip over—*i. e.*, through an angle of one hundred and eighty degrees—between each cut in order that the heads and points may be properly positioned. As it is impractical to turn the strip at a very high speed, especially with sufficient accuracy, either by hand or machinery, the capacity of machines of this the customary type is quite limited. It has also been proposed to employ two pairs of cutting and bed-plate cutters, one pair the reverse of the other, and have them operate alternately upon the nail-strip, either by reciprocating the strip (without turning it) from the plane of one pair of cutters to that of the other pair or by reciprocating the cutters alternately into the plane of the nail-plate, so as to operate alternately thereon. While my invention is applicable to either of the last-mentioned varieties, I have shown it as applied to the last, although it will be understood that it can as readily be applied to the first. In the last-described variety it is proposed to mount the cutting-cutters alternately in the same axial plane upon the periphery of a rotating cutter-head and reciprocate the bed-cutter plate, carrying the pair of bed-cutters arranged end to end a distance representing the width of the nail-strip or the length of a nail, so as to bring each bed-cutter in register with its coöperating cutting-cutter. In this construction the rapid reciprocation of the bed-cutter plate and in the other variety the rapid reciprocation of the plate-holding mechanism produced two serious difficulties, rendering the proposed machines impractical. My invention is designed to overcome both of these difficulties. The first difficulty was to secure the accurate registration of the bed-cutters with the cutting-cutters or the proper location of the nail-strip, as the case might be, at the end of each reciprocation and just prior to the cut or shear. To accomplish this, I have brought into the combination a set of guides or locking-dogs rotating with the cutter-head and corresponding in number to the cutting-cutters, which dogs intermesh alternately with two jaws fastened on the reciprocating member a distance apart represented by the width of the nail-plate or the length of the reciprocation. By the addition of these elements to the combination I am enabled to secure perfect registration of the parts at any desired speed of the machine. The second difficulty resulting from the longitudinal reciprocation of a considerable portion of the mechanism at a high rate of speed was the intolerable hammering caused by this reciprocation, which was not only deafening, but soon resulted in battering the reciprocating mechanism, so as to soon disable it. To get rid of this and thus make possible a large output, I introduce into the combination a pair of oppositely-disposed impact and return springs, which alternately receive the blow of the reciprocating member toward the end of its stroke, cushion it, and start it back as soon as the cut is completed and the cutters disengaged. By making the tension and location of these springs adjustable I am enabled to adjust them for any rate of speed that may be desired, so as to prevent any hammering whatever, and also to compel the springs to do a very large percentage of the work in shifting the reciprocating member.

My invention further relates to certain forms of construction of the cutting and bed cutters in this class of machines whereby they can be readily adjusted and when once adjusted securely retained in any desired position, whether in the cutter-head or in the bed-cutter plate.

My invention further relates to a construction in machines of the class described in which the power is applied by means of spur-rims immediately in the rear of the point of cutting, whereby the power is transmitted directly to the point of resistance, thus avoiding all overcenter strain and lost motion.

My invention further relates to a continuously-actuated spring feed mechanism whereby the nail-plates are fed to the machine at a slightly greater rate than the cutters can consume the material, thus insuring the perfect adjustment of the nail-plate strip to the cutters at the instant of cutting. To further insure this operation, I also provide a form of adjustable feed-stop to be used in connection with the spring feed mechanism.

My invention further relates to a novel mechanism for adjusting the sheet-rack while the machine is running in order to change the angle at which the nail-plate shall be fed to the cutters, so as to compensate for any changes that may occur with different qualities of nail-strips by reason of the molecular variation in the metal being operated on, the adjustment being necessary to secure a square cut in spite of the molecular variation.

My invention further relates to certain details in the construction of the different parts of these machines, as will be more fully set out in the claims.

Referring now to the drawings, in which the same characters of reference are used to designate identical parts in all the views.

The power for driving the machine is received from belts upon the driving-pulleys 1, which are located upon the ends of the power-shaft 2, which is mounted in the boxes 3, formed upon the ends of the swannecks 4, which are rigidly attached to or formed integral with the frame 5, which is of a generally rectangular shape. To prevent any longitudinal movement of the power-shaft 2, the collars A are secured upon it and are adjusted to bear against the outer faces of the boxes 3, where they may be fastened by set-screws. Suitable fly-wheels 6 are rigidly secured near the ends of this power-shaft, and the frame 5 of the machine, which is preferably cast in one piece, is very heavy, both in its web and in its top and bottom flanges, the entire machine being constructed so as to avoid vibration so far as possible. The main shaft 7, which carries the rotary cutter-head 8 and the cam-wheel 9, is mounted in boxes centrally located upon the upper surface of the ends of the frame 5.

Figure 4:
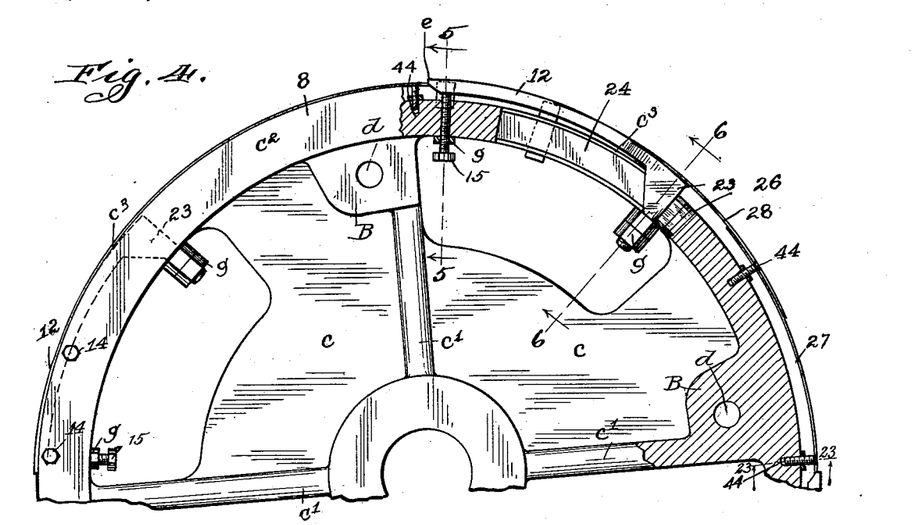
Fig. 4 is an elevation, partly in section, on an enlarged scale, of the upper half of the cutter-head, showing the cutting-cutters and the manner of retaining and adjusting the same.
Figure 5:
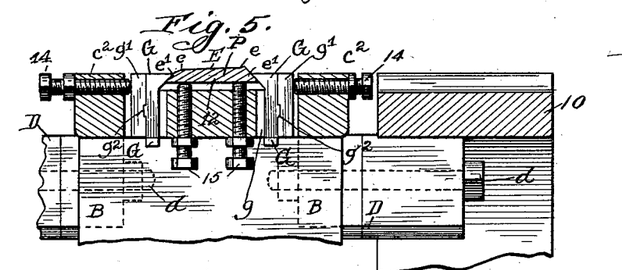
Fig. 5 is a section through the cutter-head and one of the rims on the line 5 5 of Fig. 4.
Figure 6:
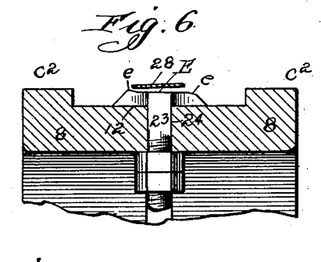
Fig. 6 is a similar section through the cutter-head on the line 6 6 of Fig. 4.

The rotary cutter-head 8, as best seen in Fig. 4, consists of the rim, which is of the general shape best shown in section in Fig. 6, which is supported by the web $c$ and the spokes $c'$, connecting it with its hub, by which it is secured to the shaft 7. The spur-rims 10 are toothed annuli, which are concentrically connected to the cutter-head by means of bolts $d$, passing through the lugs D, formed upon their interior and through the lugs B, attached to the sides of the cutter-head, as clearly shown in Fig. 5. These spur-rims 10 are driven by the gear-pinions 11, fastened to the power-shaft 2, and inasmuch as the rims 10 are rigidly attached to the periphery of the cutter-head I thus provide for the direct transmission of the power from the pinions to the periphery of the cutter-head and directly in the rear of the point of resistance—i. e., the point at which the nails are cut. By this construction all overshaft and overcenter work is avoided, with all the consequent strain, yielding, and vibration which is involved when the power is transmitted to the center of the main shaft and then outwardly to the periphery of the cutter-head, as in the ordinary construction, and I thus provide a direct and unyielding means of transmitting the power of the shaft 2 and its connected fly-wheels to the cutting of the nail, which is very essential in this class of machines.

Figures 8, 9, 10, 11, 12, 13, 14:
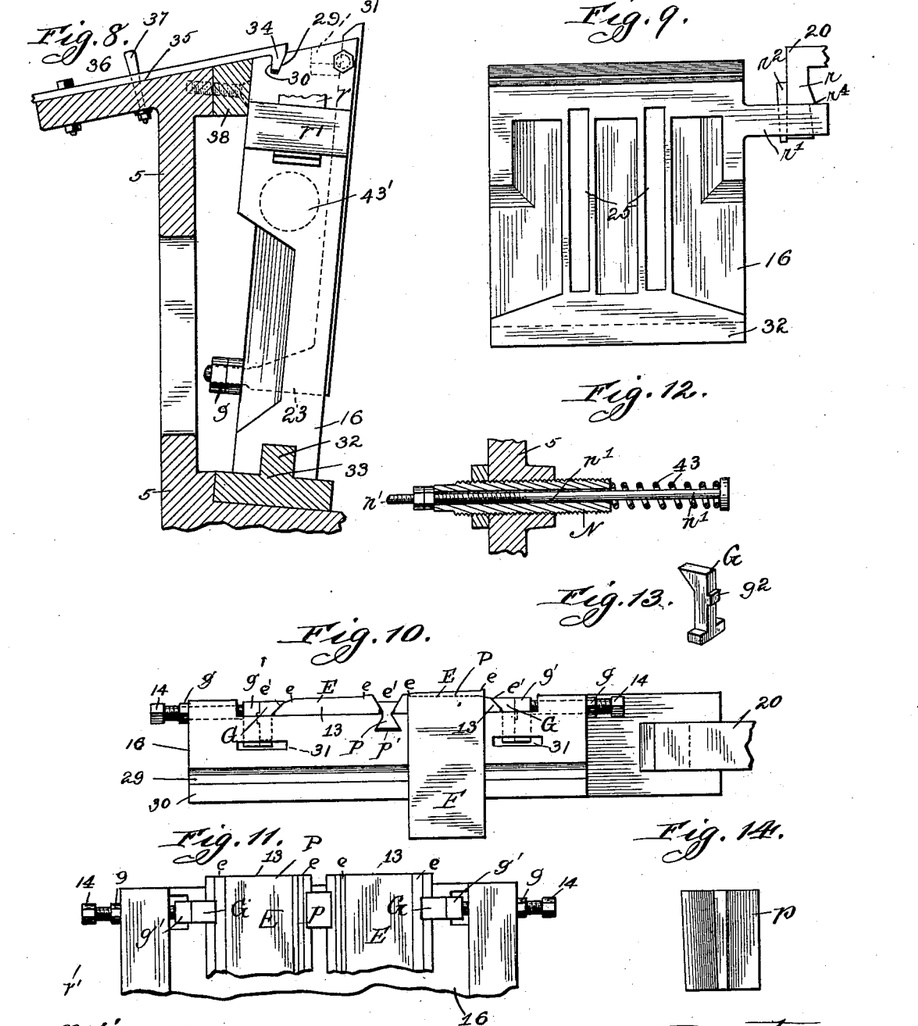
Fig. 8 is a side elevation, partly in section, showing one of the bed-cutters and the connections for retaining the same.
Fig. 9 is a front elevation of the bed-cutter plate without the cutters.
Fig. 10 is a top plan view of the bed-cutter plate, showing how the bed-cutters are held in position.
Fig. 11 is a front elevation of a portion of the bed-cutter plate, showing the bed-cutters in position.
Fig. 12 is a section on the line 12 12 of Fig. 1, showing the impact and return springs and the mechanism for adjusting the same.
Fig. 13 is a perspective view of one of the clamps for holding the bed-cutters in position.
Fig. 14 is a side elevation of a double dovetailed block for retaining the bed-cutters in position.
Figure 24:
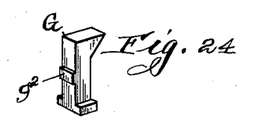
Fig. 24 is a perspective view of one of the retaining-clamps for the cutting-cutters.

The cutting-cutters 12, of which there are preferably four upon each head, being two pairs, are formed with the inclined cutting-surfaces E for cutting the taper of the nails and the still more inclined cutting-surfaces $e$ for cutting the heads and points of the nails. I preferably make this incline E of about seventeen one-thousandths of an inch to the inch for nails for ordinary use, and the cutting-surfaces $e$ I incline at angles of about twenty-five degrees from the horizontal. While the dimensions given are believed to be the best for holding power in the softer timbers, it may be found advisable to change the angles of the inclines E and $e$ for special timbers or special purposes. The cutting-surfaces $e$ on both the cutting-cutters 12 and the bed-cutters 13 are extended beyond the width of the nail-plate F, as shown in Fig. 10, for the purpose of giving strength to the cutters and avoid fracture of the same, thus providing a shear action in the cutting of chisel-pointed and bevel-headed nails and wholly eliminating from the cutters all projections or points for forming the heads and points of these nails, the presence of which points rendered former invention for cutting these nails impractical and valueless on account of the constant fracturing thereof. The sides of the cutters are formed by the inclined surfaces $e'$, which have an angle of about forty-five degrees, and are engaged by the correspondingly-inclined surfaces on the T-tailed cutter-retaining bolts G. (Shown in Fig. 24.) The T-shaped ends of these bolts G pass freely into slots $g$, axially located in the periphery of the cutter-head, and by a quarter-turn are firmly held in position. Set-screws 14, provided with check-nuts, pass through the rim of the cutter-head 8, and may engage directly with the bolts or blocks G, but preferably engage with blocks $g'$, which bear against the outer edge of the cutter-retaining bolts G and are held from displacement relative to the blocks or bolts G by reason of the rectangular projection $g^2$ thereon, which takes into the correspondingly-shaped channel in the block $g'$. As many of these auxiliary blocks $g'$ may be employed as are necessary in adjusting cutters of different widths to the same cutter-head. Another pair of set-screws 15, provided with check-nuts, pass through the periphery of the cutter-head and take against the rear side of the cutter 12, so as to adjust it at any desired distance from the periphery of the cutter-head. It will be readily seen that by means of the construction herein employed I am enabled to adjust the cutter in any position that may be required and having adjusted it to retain it unyieldingly in position by means of the set-screws 14, causing the inclined surfaces on the locking-bolts G to coöperate with the inclined surfaces $e'$, forming the sides of the cutters.

The revolving cutter-head 8, the spur-rims 10, and the cam-wheel 9 are all of the same outside diameter, thus making it possible to locate the bed-cutter plate 16 close to the face of the cutter-head and also to provide for the engagement of the guides 17, located upon the right-hand edge of the right-hand spur-rim 10, with the guide-jaws 18 and 19, located on the connecting-rod 20, and also to provide for the direct engagement of the camway 21 with the cross-head jaws 22 and still have the connecting-rod in axial and horizontal alinement with the main shaft 2. The pair of complementary bed-cutters 13, which have their cutting-surfaces exactly the same as those of the cutting-cutters 12, are secured in the bed-cutter plate 16 (to be more fully described) by set-screws 14, which are similar to and operate in exactly the same way as the corresponding set-screws in connection with the cutting-cutters. Inasmuch as there is the pair of cutters arranged side by side, I find it convenient to hold their inner ends by means of the double dovetailed block $p$, which fits into the dovetailed groove $p'$ in the rear surface of the bed-plate, and has its other inclines coöperating with the inclines $e'$, forming the inner edges of the bed-plate cutters 13. When the set-screws 14 are tightened, it will be seen that their longitudinal thrust is transmitted to the block P, drawing it firmly against the inclined edges of the groove P', and securing the inner sides of the bed-plate cutters from any possible movement.

Figure 7:
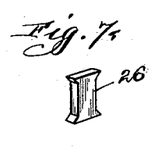
Fig. 7 is a perspective view of one of the cutter adjusting and retaining blocks.

The cutting and bed cutters are formed with the shanks 23, which project through the slots 24 in the periphery of the cutter-head 8 and in the slots 25, located in the bed-cutter plate, respectively. These shanks 23 are provided with nuts and check-nuts, by which the cutters can be adjusted as they are shortened by grinding. Inasmuch as these shanks receive the impact of the cutting and as the cutters are adjusted to take up the wear I preferably insert the double T-headed blocks 26 (shown in Figs. 4 and 7) between the shanks and the ends of the slots, thus forming a solid resistance for the impact of the cutting. The formation of these blocks into double T-heads is employed simply to prevent their dropping out during the adjustment of the cutter or when in operation. As seen in Fig. 8, the bodies of the bed-cutters are straight, while owing to the fact that they are mounted upon the curved cutter-head the bodies of the cutting-cutters are curved on the arc of a circle to correspond with that of the periphery of the cutter-head. In order to provide for the immediate clearance of the cutting-cutters from the bed-cutter as soon as the nail is sheared off, I mount the cutting-cutters eccentrically to the cutter-head, as clearly shown in Fig. 4. This eccentric adjustment can be readily secured by means of the adjusting-nuts 15, which remove the cutting end of the cutter from the axis of the shaft 7 as far as may be necessary, while the shank end is secured in place by means of its nut and lock-nut. I may further insure the stability of the parts in the eccentric position by mounting a second set of set-screws 14 about midway between the first set and the shank of the cutter. If it is deemed to be desirable, I may make the cut-away portion $c^3$, in which the blade of the cutting-cutter is mounted, eccentric to the periphery of the cutter-head; but this is not absolutely essential.

Figures 15, 16, 17, 18, 19, 20, 21, 22:
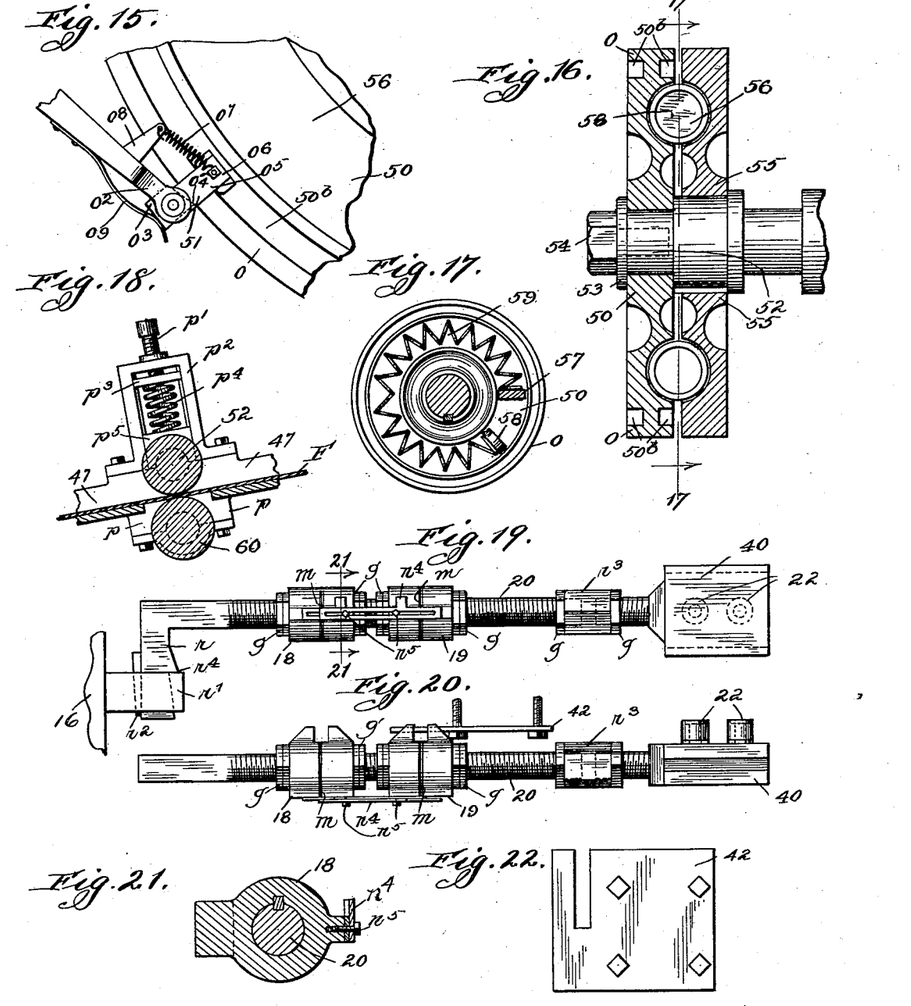
Fig. 15 is a view of a portion of the feed-disk and the clutch-pawl coöperating therewith.
Fig. 16 is a central section through the feeding-disk and its coöperating spring-connected disk on the feed-roll shaft.
Fig. 17 is a side elevation of the spring-connected disk on the feed-roll shaft, showing its connection with the feeding-disk, the figure being a section on a reduced scale on the line 17 17 of Fig. 16.
Fig. 18 is a central section through the feed-rolls.
Fig. 19 is a front elevation of the connecting-rod between the cam-wheel and the bed-plate reciprocated thereby, showing guide-jaws and mechanism for adjusting the same.
Fig. 20 is a top plan view of the parts shown in Fig. 19.
Fig. 21 is a cross-section on the line 21 21 of Fig. 19.
Fig. 22 is an elevation of a support for the connecting-rod and the guide-jaws carried thereby.

By referring to Fig. 10, where the nail-plate F is shown to be in the proper position over the right-hand bed-cutter, it will be seen that to coöperate therewith in its shearing action a cutting-cutter plate must be exactly complementary thereto, so that the shape of the nail sheared off will be represented by the end of the nail-plate and the dotted line representing the outline of the bed-cutter beneath it. As the nail-plate F is advanced by means of the feeding mechanism to be subsequently described it will be seen that if the same-shaped bed and cutting cutters were employed on the next cut the nail would not be produced, but the cut would be a piece having its sides parallel. In order to get the proper cut for the next nail, it becomes necessary to have the next cut made by cutting and bed cutters which have a reverse shape from that of the nails which have just acted. This is readily accomplished by having each succeeding cutting-cutter reversed as to head and point from its predecessor, and in order to make the necessary change in the bed-plate cutter I make arrangements to bring the left-hand bed-cutter to the position occupied by the right-hand bed-cutter. This is accomplished by means of the camway 21 upon the cam-wheel 9 coöperating with the antifriction-rollers 22, which project from the cross-head 40 and form the guides, whereby the cross-head and the bed-cutter plate by reason of the connecting-rod 20 are caused to reciprocate with the rotary motion of the cam-wheel 9. The camway 21 consists of four straight portions $R^2$, which are connected by inclined curves $R'$, and the alternate straight portions $R^2$ are nearer to the opposite sides of the wall and are distant from each other longitudinally of the axis of the wheel an amount represented by the width of the nail-plate or the length of the nail and the overlap of the cutters over the plate. The straight portions $R^2$ of the camway are brought into action slightly in advance of the operation of the cutters, so that the bed-cutter is properly positioned and stationary prior to the action of the cutting-cutter. Thus it will be seen that the action of the machine automatically brings the proper bed-cutter into position to coöperate with the corresponding cutting-cutter. The bed-cutter plate 16 is of the general shape best shown in Figs. 8 to 11 and is retained in proper position during its reciprocating movement by reason of the guide-rail 33, which takes into the groove 32, formed in the underside of the plate, while the position of the upper end of the bed-cutter plate is secured by means of the guiding-strip 34, formed upon the plate 35 and working in a correspondingly-shaped groove 29, formed in the upper side of the bed-plate. This plate 35 is held down upon the frame 5 of the machine by the cap-bolts 36 and drawn back so as to make a close working fit of the bed-cutter plate against the inner face of the way-block 38 by means of the tapered key 37. The connecting-rod 20, as best shown in Figs. 9 and 19, is provided with the arm $r$, which connects with the bed-cutter plate 16 unyieldingly by means of the lug $r'$, projecting therefrom, which has an oblique slot therein, into which the beveled end of the arm $r$ takes and is held in position by the tapered key $r^2$, as clearly shown by the dotted lines in the aforesaid figures. A shoulder $r^4$, formed on the arm $r$ and coöperating with the upper surface of the lug $r'$, prevents any possible vertical displacement between the bed-cutter plate and the connecting-rod. The connecting-rod is at its free end connected with the cross-head 40 by means of the right and left hand threaded thimble $r^3$. The cross-head 40 is properly supported and guided by ways located in the bracket 41, secured to the frame 5.

To insure absolute accuracy in the relative positions of the cutting-cutters and bed-cutters at the instant of cutting, I mount upon the screw-threaded portion of the connecting-rod 20 the guide-jaws 18 and 19, each of which is formed by two similar pieces, preferably of tempered steel, passed onto the rod, then secured in proper position by a set of nuts and check-nuts at each end, and held from turning on the rod by a customary spline or key.

The upper edges of these guide-jaws are beveled outwardly to provide for the safe entrance alternately of the guides 17, which, as previously stated, are rigidly secured to the edge of the right-hand spur-pinion 10 by riveting or otherwise. These guides 17 are also provided with a long easy bevel to insure their safely entering the guide-jaws 18 and 19, the exact coöperation of the guide-jaws not being necessary until just previous to and during the instant of cutting. These guide-jaws are supported at the instant of contact by means of the bridge-plate 42. Inasmuch as the guides 17 are turned up and ground in position on the spur-rim and the guide-jaws can be adjusted with absolute accuracy to the distance apart represented by the width of the strip being operated upon, it will be seen that by the employment of this mechanism interlocking the two members holding the cutting and bed cutters at the moment of cutting I am enabled to secure absolutely accurate registration of the bed-plate cutters and cutting-cutters, so as to prevent any wear thereof except that incidental to the shearing action of the parts. In case of wear of the guide-jaws 18 and 19 or of the guides 17 it can be taken up readily and accurately by removing one of the rings $m$ from between the guide-jaws and inserting thinner ones, thus saving the time necessary to remove or grind the guides.

Figure 1:
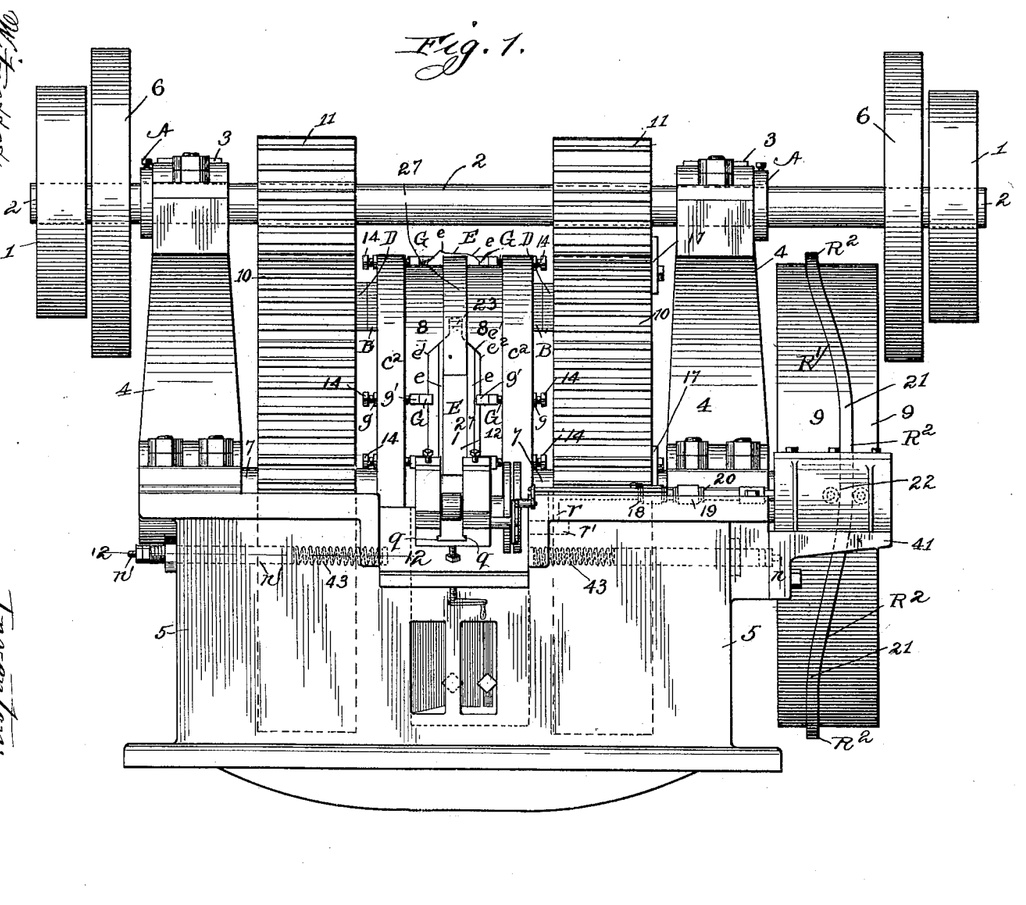
Figure 1 is a front elevation of the complete machine.
Figure 3:
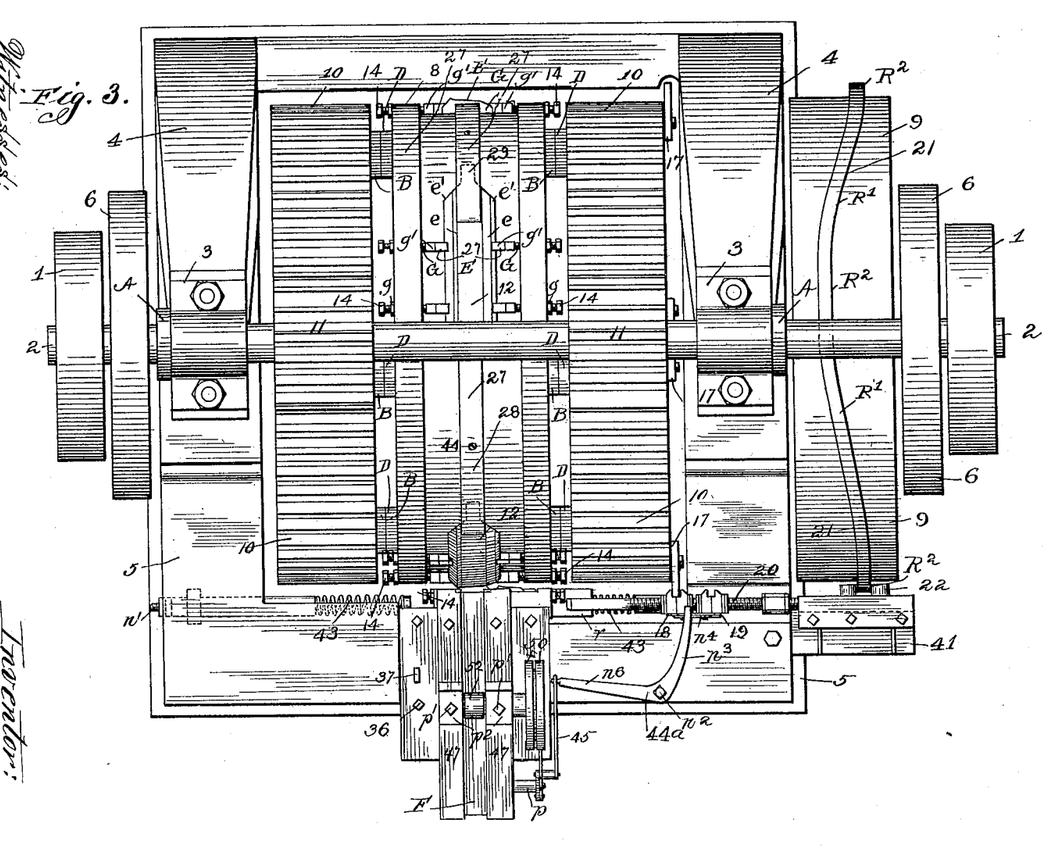
Fig. 3 is a top plan view.

While it would be possible to depend upon the action of the camway 21 upon the cross-head 40 to reciprocate the bed-cutter plate, I preferably employ impact and return springs for this purpose and use the camway and cross-head simply as a guide for the movement of the bed-cutter plate instead of the motive power. Referring to Figs. 1 and 3, where the location of the impact-springs will be seen, and more especially to Fig. 12, where the details of one of them are shown, it will be seen that I provide a heavy helical expanding spring 43, which is confined between the end of the threaded thimble N, secured in the sides of the frame 5 by means of a lock-nut, and the enlarged inner end of the threaded stem or rod $n'$, passing through the thimble N and having a nut and lock-nut on the end thereof, whereby the amount of tension on the spring may be regulated. It will be seen that the location of the head of the stem $n'$, which receives the impact of the bed-cutter plate on its respective sides, can be adjusted by adjusting the position of the thimble N in the frame 5. It will be seen that these devices provide means for adjustably locating and tensioning these springs 43, so that when the bed-cutter plate is thrown in one extreme position the spring at that end will be sufficiently compressed so that as soon as it is released from the locking effect of the guides 17 and jaws 18 and 19 it will be started toward its other extreme position by the recoil of the spring 43. When it reaches the other extreme position, the other spring 43 comes into action and the operation is reversed. It will be seen that by this construction I remove almost all of the work from the camway 21 and the cross-head and that by properly adjusting the location and tension of the springs I can run the machine at any desired speed without any hammering resulting from the rapid reciprocation of the bed-cutter plate. It will be seen that this feature of my invention enables me to run my machine at a rate of speed hitherto unknown in this class of devices, and thereby increasing its utility by materially increasing the output of the machine.

By a careful consideration of the operation of the rotary guides and locking-jaws, taken in connection with the impact and return springs, it will be seen that at one position of the reciprocating mechanism the rotating guide is held firmly against one of the locking-jaws, while the other is practically idle— i. e., there is no material contact between that jaw and the corresponding side of the rotating locking-guide. At the other position of the reciprocating mechanism the same action takes place, the return-spring at that end holding the rotating guide firmly against one of the locking-jaws, and thus virtually dispensing with the operation of the other. It will be seen that I might by these means dispense with the inner one of each pair of the locking-jaws, and thus depend upon the springs to hold them in place; but as a matter of precaution I have provided the locking-jaws arranged in pairs, as shown.

Figure 23:
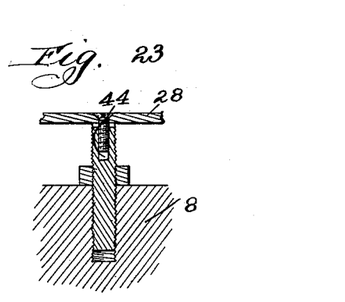
Fig. 23, Sheet 4, is a sectional view, on an enlarged scale, on the line 23 23 of Fig. 4.

The feed of the strips F of the nail-plate to the cutters is accomplished by means of a roller impelled by spring-power, which is taken from the reciprocating motion of the connecting-rod 20, and the strips are driven through suitably-located guides upon a line with the cutting-cutters, and the amount of feed for each nail is determined by the location of the adjustable feed-stops 27 and 28, thus providing for nails of uniform width. The feed-stop consists of two plates 27 and 28, (best shown in Fig. 4,) curved to conform to the outer circle of the cutter-head 8 and about as wide as the nail-plate to be operated upon. Each section of these plates is retained in position and adjusted by means of the threaded thimbles 44, which are located in the periphery of the cutter-head, as clearly shown by the section in Fig. 23. These feed-stop plates rest upon these thimbles and are held in position by countersunk cap-screws, which are threaded into the thimbles. The forward end of the plate 28 rests in a cut-away portion in the shank 23 of its cutter 12, which portion is slightly deeper than the thickness of the plate to avoid all possibility of catching the nail-plate, and the other end of this plate 28 extends well over the forward end of the plate 27, and both these plates are provided with longitudinal slots (not shown) so constructed and arranged that the entire space between the shank of one cutter and the cutting-face of the succeeding one can, as the cutters are worn and ground in use, be at all times covered by the feed-stop plates. The position of the end of the plate 27 as the same rests against the face of each cutter 12 is adjusted to a position below the cutting edge of the cutter exactly the width of the nail to be cut, thus providing for an adjustable but positive feed-stop, insuring absolute uniformity in the width of the nails. The rear end of the plate 28 should be properly tapered, which, with the eccentric position of the cutting-cutters, will provide a gradual incline from the cutting edge of one cutter and the cutting edge of its successor, thus affording a uniform and constant motion for the feed and ample time for the plate to be fed forward between the cuts of the nails.

Referring now more especially to Fig. 3, the bell-crank feed-lever 44ª is pivotally mounted on the upper surface of the frame by the cap-bolt $n^2$, and the arm $n^3$ is actuated by the plates $n^4$, (see Fig. 19,) which may be attached to the connecting-rod 20 at any point, but which I preferably attach to the jaws 18 and 19 by means of the cap-bolts $n^5$, passing through slits in the plates, by which they can be adjusted, so that by their impact with the arm $n^3$ of the bell-crank lever any desired amount of motion can be communicated thereto from the reciprocating motion of the connecting-rod 20. A rod 45 connects the end of the arm $n^6$ with the feed-lever 46, (see Fig. 2,) which is pivoted to the feed-rack 47 by the bolt and is provided at its ends with the actuating-pawls 48 and 49, and there is pivotally mounted also upon the bolt the check-pawl $50^a$. It will be readily seen that by the reciprocation of these parts the feed-pawls 48 and 49 will alternately advance the feeding-disk 50, while the detent or check pawl $50^a$ will prevent any backward movement of the feeding-disk.

While the feeding mechanism would operate with a certain degree of success if the ordinary dog and notched disks were employed, I preferably employ the construction now to be described in detail and best shown in Figs. 15 and 16. The feeding-disk 50 has two concentric circular grooves $50^b$ oppositely disposed upon the two sides of the disk. The ends of the pawl-arms (shown in detail in Fig. 15) are bifurcated and by their construction form a clutch 51. Pivotally mounted in the bifurcated end $o^2$ of the pawl-arm is the dog $o^3$, of the shape clearly shown by the full and dotted lines. A curved leaf-spring $o^9$, mounted upon the pawl-arm and bearing against the dog $o^3$, serves to hold it with its nose $o^4$ engaging the periphery of the feed-disk. To retain it in position on the disk and to operate as the other member of the clutch, I also pivotally mount in the end of the arm the auxiliary arms or straps $o^5$, which pass the rim $o$, formed by the grooves $50^b$, and have secured to their ends the blocks or lugs $o^6$, which take against the outer side of the grooves $50^b$. Coiled springs $o^7$, fastened to the ends of the straps $o^5$ and to the lugs $o^8$, projecting from the arm of the pawl, hold the blocks $o^6$ in engagement with the outer edge of the grooves $50^b$. It will be seen that with the construction described as the pawl-arm is moved forward the nose $o^4$ of the dog $o^3$ will be forced into engagement with the periphery of the disk 50 and carry it forward with it. As this pawl is withdrawn and the other advances the dog $o^3$ will slip back over the periphery, the clutch 51, formed by the dog $o^3$ and the blocks $o^6$, not being operative during the movement in this direction. By using this form of a clutch-pawl I am enabled to set the pawls for any desired variation in feed, however fine, and am not dependent on the length of the notches constituting the ratchet-teeth of the ordinary feed mechanism.

The feed-disk 50 moves freely upon the reduced section of the feed-roll 52 and is retained in position by the washer 53 and cap-bolt 54. The companion disk 55 is rigidly attached to the larger section of the journal of the feed-roll, and both these disks are constructed with the opposed annular grooves 56, which, taken together, form a circular annular channel in which are mounted the spring-seats 57 and 58, projecting into the groove from the disks 50 and 55, respectively, as shown in Fig. 17. The helical expanding-spring 59 is placed in the groove and its ends rest upon the spring-seats 57 and 58, so that if the disk 50 is fed forward more rapidly by the pawls than the action of the feed-rollers permits the disk 55 to move the spring 59 will be put under a tension tending to keep the disk 55 moving forward as rapidly as the cutting of the nails from the plate will permit. The companion feed-roll 60 is located beneath the feed-roll 52, its trunnions bearing in the lug $p$, formed on or secured to the nail-plate guide 47, and the feed-roll 52 is forced into proper engagement with the nail-plate F by means of the cap-bolt $p'$ passing through the top member of the housings $p^2$ and bearing upon the plate $p^3$, which in turn bears upon the expanding helical spring $p^4$, which takes against the sliding half-box $p^5$. Of course it will be understood that I might substitute rubber or some other yielding substance for the spring $p^4$, if desired. In order to be sure that a sufficient feed of the strip F is always secured, motion slightly in excess of the amount actually required is taken from the adjustable plates $n^4$. This excess is first taken up in the compression of the spring 59 and then by the slipping of the feed-rollers, thus providing a very powerful, accurate, and continuous automatic feeding device.

Figures 2, 25, 26:
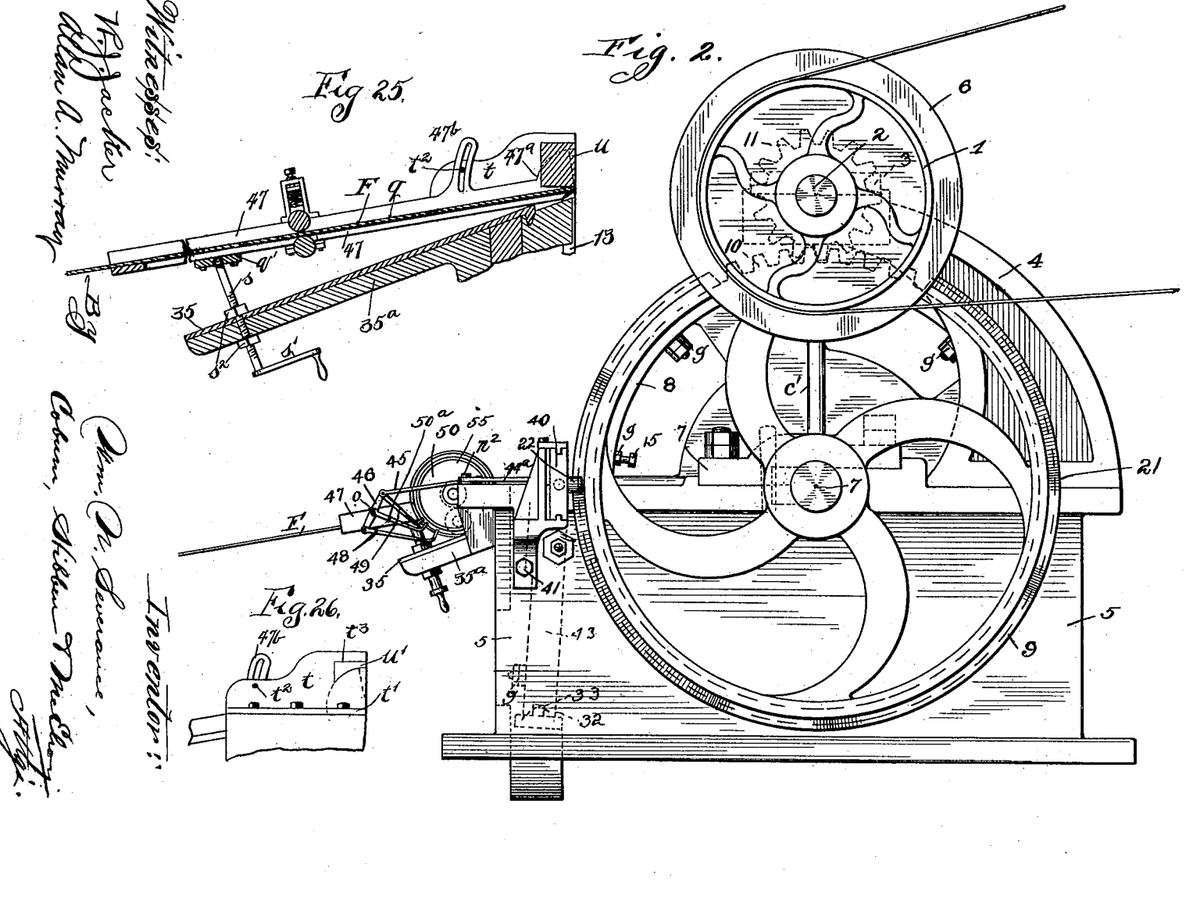
Fig. 2 is an elevation of the right-hand side.
Fig. 25 is a central longitudinal section showing the preferred form of the strip-feeding mechanism.
Fig. 26 is a side elevation of that portion of the same mechanism which is adjacent to the bed-cutter.

In Figs. 1, 2, and 3 I have shown the simplest form of nail-plate support, in which the pieces 47, constituting the sides thereof, have cut therein the grooves $q$, which are of sufficient width and sufficiently far apart to just accommodate the nail-plate, which is fed through them to the point where it is sheared off. In order to change the angle at which this nail-strip shall be fed to the cutters, as is frequently necessary to compensate for the varying molecular structure of the nail-plate and the consequent variation of the molecular slip in the act of cutting, so as to provide for a uniformly square cut, I provide means for raising and lowering the outer end of the strip-holder, as seen in Figs. 1 and 2 and more especially in Fig. 25. This mechanism consists of a screw $s$, having its end arranged in a bearing formed in the cross-piece $q'$, connecting the two strips 47, this bearing being formed so as to permit of a slight movement of the end of the screw therein, as may be necessary in the change of the angular relation between the screw $s$ and the feed-plate. This screw $s$ has a handle $s'$, by which it may be manipulated to raise and lower the feed-plates, and to securely retain the holder at any desired angle I provide the check-nuts $s^2$, which may be rapidly raised and lowered in order to furnish any desired adjustment of the screw.

In Figs. 25 and 26 I have illustrated the connections between the feed-rack and the main frame 5. Secured to the main frame 5 on either side of the plate $35^a$, which furnishes the support for the adjusting-plate 35, are the plates $t$, which have the general shape shown in the figures and are secured to the upper surface of the main frame by the flanges $t'$, bolted thereto. The nail-strip guide-pieces 47 terminate in the segmental portions $47^a$, (shown partly in full line in Fig. 25 and in dotted lines in Fig. 26,) which have their curve about the tip of the bed-cutter as a center. Each of the pieces 47 has also segmental guides $47^b$, which also have the same point as a center and coöperate with the pins $t^2$, projecting inward from the plates T. In order to hold the extreme tips of the nail-strips and also to furnish a more positive bearing for the segmental portion $47^a$ of the nail-plate guides, I provide the block $u$, which is, as seen in Fig. 25, rectangular in cross-section, but which has projecting out from either end the wing $u'$, which is of the shape seen in Fig. 26 and which fits in a similarly-shaped aperture or notch $t^3$ in the plates $t$ and also takes over the segmental portions $47^a$, forming therefor a kind of a half-box bearing. It will be seen that as the screw $s$ is operated after the check-nuts $s^2$ have been withdrawn from contact with the plates 35 and $35^a$ the nail-plate guide will be turned about the tip of the bed-cutter as a pivot, and thereby the angle at which the nail-strip is cut may be varied at the pleasure of the operator in order to secure a square cut despite any variation in the molecular slip, and, furthermore, that this adjustment may be made while the machine is running and without any slackening of the speed.

The operation of my improved machine will be readily apparent. After the cutters are properly adjusted in their holders by the mechanism previously described and while the guides 17 are in the jaws 18 or 19, as the case may be, these jaws are so adjusted on the connecting-rod 20 as to bring each of the bed-cutters into proper position to coöperate exactly with the corresponding cutting-cutters, and the jaws are then securely locked in position by their check-nuts. Upon first starting the machine the operator should give it a gradually-increasing motion to enable him to so adjust the impact and return springs 43 as to prevent at the desired speed any hammering of the camway 21 and the jaws or rollers 22. This adjustment, which is to be changed for each change in the rate of speed of the machine, is made by adjusting the position and also the tension of the impact and return springs by means of the mechanism hitherto described. When these springs are properly adjusted for tension and position, all initial impact strain incurred by the starting and stopping of the reciprocating motion of the bed-cutter plate is transferred to them, and the cam-way 21 will thus have little more to do than to limit and control the action of these springs. The proper pressure is placed upon the sheet by the feed-roll, which provides sufficient thrust to the nail-plate, and the plates $n^4$ are so adjusted as to afford slightly more feed-motion to the feed-roll 52 than is required, the surplus being first taken up in compressing the spring 59 and then by the feed-rolls slipping upon the nail-plate. After the machine is adjusted and in operation it will be seen that at each quarter-turn of the shaft 7 a nail will be sheared off and no possible variation in the relative position of the bed and cutting cutters can take place, inasmuch as the operation of the guides 17 and the guide-jaws 18 and 19 always insures their being in the same relative position. As soon as the cutters are cleared from each other by reason of the eccentric location or adjustment of the cutting-cutter and the corresponding guide or locking-dog 17 is released from the locking-jaws the action of the compressed impact-spring starts the bed-cutter plate to its other position, the movement of which is controlled and assisted by the coöperation of the cam-way 21 with the antifriction-rollers 22 on the cross-head. When the other position of the bed-cutter plate is reached, another nail is sheared off, but with its head in the opposite direction from the point of the preceding nail, as is necessary in this class of machines.

While I have illustrated my invention in the form which I at present consider best adapted for practical use, it will be understood that it is capable of many changes and modifications without departing from the spirit of the invention, and that consequently I do not desire to be limited to the exact form shown and described, but only so much as may be necessary by the terms of the following claims interpreted by the state of the art.

I claim—

1. In a machine of the class described, the combination of a rotating cutter-head having one or more pairs of complementary cutting-cutters arranged thereon, with a bed-cutter plate having a pair of complementary bed-cutters, reciprocating mechanism for bringing alternate pairs of coöperating cutting and bed cutters into operation upon a nail-sheet, so as to cut heads and points alternately from the same end without turning the nail-sheet, guides or locking-dogs corresponding in number to the cutting-cutters and rotating with the cutter-head, and a pair of locking-jaws connected to and moving with said reciprocating mechanism and coöperating with said guides or locking-dogs to lock the reciprocating mechanism from movement relative to the cutter-head during the cutting operation.

2. In a machine of the class described, the combination of a rotating cutter-head having one or more pairs of complementary cutting-cutters arranged thereon, with a bed-cutter plate having a pair of complementary bed-cutters, reciprocating mechanism for bringing alternate pairs of coöperating cutting and bed cutters into operation upon a nail-sheet, so as to cut heads and points alternately from the same end without turning the nail-sheet, means for rotating said cutter-head and operating the reciprocating mechanism, a pair of oppositely-disposed impact and return springs to cushion the strokes of the reciprocating mechanism and overcome the inertia thereof, guides corresponding in number to the cutting-cutters and rotating with the cutter-head, and guide-jaws connected to and moving with said reciprocating mechanism and coöperating alternately with said guide-jaws to prevent the movement of the reciprocating mechanism by the stress of the springs until the cutting operation is completed.

3. In a machine of the class described, the combination of a rotating cutter-head having one or more pairs of complementary cutting-cutters arranged thereon, with a bed-cutter plate having a pair of complementary bed-cutters, reciprocating mechanism for bringing alternate pairs of coöperating cutting and bed cutters into operation upon a nail-sheet, so as to cut heads and points alternately from the same end without turning the nail-sheet, means for rotating said cutter-head and operating the reciprocating mechanism, a pair of oppositely-disposed impact and return springs to cushion the strokes of the reciprocating mechanism and overcome the inertia thereof, means for adjusting the tension of said springs, guides corresponding in number to the cutting-cutters and rotating with the cutter-head, and guide-jaws connected to and moving with said reciprocating mechanism and coöperating alternately with said guide-jaws to prevent the movement of the reciprocating mechanism by the stress of the springs until the cutting operation is completed.

4. In a machine of the class described, the combination of a rotating cutter-head having one or more pairs of complementary cutting-cutters arranged thereon, with a bed-cutter plate having a pair of complementary bed-cutters, reciprocating mechanism for bringing alternate pairs of coöperating cutting and bed cutters into operation upon a nail-sheet, so as to cut heads and points alternately from the same end without turning the nail-sheet, means for rotating said cutter-head and operating the reciprocating mechanism, a pair of oppositely-disposed impact and return springs to cushion the strokes of the reciprocating mechanism and overcome the inertia thereof, means for adjusting the position of said springs, guides corresponding in number to the cutting-cutters and rotating with the cutter-head, and guide-jaws connected to and moving with said reciprocating mechanism and coöperating alternately with said guide-jaws to prevent the movement of the reciprocating mechanism by the stress of the springs until the cutting operation is completed.

5. In a machine of the class described, the combination of a rotating cutter-head having one or more pairs of complementary cutting-cutters arranged thereon, with a bed-cutter plate having a pair of complementary bed-cutters, reciprocating mechanism for bringing alternate pairs of coöperating cutting and bed cutters into operation upon a nail-sheet, so as to cut heads and points alternately from the same end without turning the nail-sheet, means for rotating said cutter-head and operating the reciprocating mechanism, a pair of oppositely-disposed impact and return springs to cushion the strokes of the reciprocating mechanism and overcome the inertia thereof, means for adjusting the tension and position of said springs, guides corresponding in number to the cutting-cutters and rotating with the cutter-head, and guide-jaws connected to and moving with said reciprocating mechanism and coöperating alternately with said guide-jaws to prevent the movement of the reciprocating mechanism by the stress of the springs until the cutting operation is completed.

6. In a machine of the class described, the combination of a rotating cutter-head having one or more pairs of complementary cutting-cutters arranged thereon, with a bed-cutter plate having a pair of complementary bed-cutters, reciprocating mechanism for bringing alternate pairs of coöperating cutting and bed cutters into operation upon a nail-sheet, so as to cut heads and points alternately from the same end without turning the nail-sheet, means for rotating said cutter-head, means for moving the reciprocating mechanism comprising a cam rotating with said cutter-head, a pair of oppositely-disposed impact and return springs to cushion the strokes of the reciprocating mechanism and overcome the inertia thereof, guides corresponding in number to the cutting-cutters and rotating with the cutter-head, and guide-jaws connected to and moving with said reciprocating mechanism and coöperating alternately with said guide-jaws to prevent the movement of the reciprocating mechanism by the stress of the springs until the cutting operation is completed.

7. In a machine of the class described, the combination of a rotating cutter-head having one or more pairs of complementary cutting-cutters arranged thereon, with a bed-cutter plate having a pair of complementary bed-cutters, reciprocating mechanism for bringing alternate pairs of coöperating cutting and bed cutters into operation upon a nail-sheet, so as to cut heads and points alternately from the same end without turning the nail-sheet, guides or locking-dogs corresponding in number to the cutting-cutters and rotating with the cutter-head, a pair of locking-jaws connected to and moving with said reciprocating mechanism and coöperating with said guides or locking-dogs to lock the reciprocating mechanism from movement relative to the cutter-head during the cutting operation, and a pair of oppositely-disposed impact and return springs adapted to coöperate with the reciprocating mechanism to cushion its strokes and overcome the inertia.

8. In a machine of the class described, the combination of a rotating cutter-head having one or more pairs of complementary cutting-cutters arranged thereon, with a bed-cutter plate having a pair of complementary bed-cutters, reciprocating mechanism for bringing alternate pairs of coöperating cutting and bed cutters into operation upon a nail-sheet, so as to cut heads and points alternately from the same end without turning the nail-sheet, guides or locking-dogs corresponding in number to the cutting-cutters and rotating with the cutter-head, a pair of locking-jaws connected to and moving with said reciprocating mechanism and coöperating with said guides or locking-dogs to lock the reciprocating mechanism from movement relative to the cutter-head during the cutting operation, a pair of oppositely-disposed impact and return springs adapted to coöperate with the reciprocating mechanism to cushion its strokes and overcome the inertia, means for rotating said cutter-head, and means for operating said reciprocating mechanism comprising a rotary cam connected to and moving with said rotating cutter-head.

9. In a machine of the class described, the combination of a rotating cutter-head having one or more pairs of complementary cutting-cutters arranged successively on its periphery, with a reciprocating bed-cutter plate having a pair of complementary bed-cutters arranged to coöperate with their corresponding cutting-cutters, means for rotating said cutter-head and reciprocating said bed-cutter plate, guides or locking-dogs corresponding in number and position to the cutting-cutters and rotating with the cutter-head, and a pair of locking-jaws connected to and reciprocating with the bed-cutter plate and coöperating with said locking-dogs to lock the bed-cutter plate from movement relative to the cutter-head during the cutting operation.

10. In a machine of the class described, the combination of a rotating cutter-head having one or more pairs of complementary cutting-cutters arranged successively on its periphery, with a reciprocating bed-cutter plate having a pair of complementary bed-cutters arranged to coöperate with their corresponding cutting-cutters, means for rotating said cutter-head and reciprocating said bed-cutter plate, guides or locking-dogs corresponding in number and position to the cutting-cutters and rotating with the cutter-head, and a pair of locking-jaws connected to and reciprocating with the bed-cutter plate and coöperating with said locking-dogs to lock the bed-cutter plate from movement relative to the cutter-head during the cutting operation, said jaws consisting of the members 18 and 19 threaded on the connecting-rod 20 and adjustably held in place by nuts and jam-nuts on said rod.

11. In a machine of the class described, the combination of a rotating cutter-head having one or more pairs of complementary cutting-cutters arranged successively on its periphery, with a reciprocating bed-cutter plate having a pair of complementary bed-cutters arranged to coöperate with their corresponding cutting-cutters, means for rotating said cutter-head and reciprocating said bed-cutter plate, guides or locking-dogs corresponding in number and position to the cutting-cutters and rotating with the cutter-head, and a pair of locking-jaws connected to and reciprocating with the bed-cutter plate and coöperating with said locking-dogs to lock the bed-cutter plate from movement relative to the cutter-head during the cutting operation, said jaws consisting of the members 18 and 19 threaded on the connecting-rod 20 and adjustably held in place by nuts and jam-nuts on said rod and having the rings $m$ interposed between them.

12. In a machine of the class described, the combination of a rotating cutter-head having one or more pairs of complementary cutting-cutters arranged successively on its periphery, with a reciprocating bed-cutter plate having a pair of complementary bed-cutters arranged to coöperate with their corresponding cutting-cutters, means for rotating said cutter-head and reciprocating said bed-cutter plate, guides or locking-dogs corresponding in number and position to the cutting-cutters and rotating with the cutter-head, a pair of locking-jaws connected to and reciprocating with the bed-cutter plate and coöperating with said locking-dogs to lock the bed-cutter plate from movement relative to the cutter-head during the cutting operation, and a pair of oppositely-disposed impact and return springs adapted to coöperate with the reciprocating mechanism to cushion its strokes and overcome the inertia thereof.

13. In a machine of the class described, the combination of a rotating cutter-head having one or more pairs of complementary cutting-cutters arranged successively on its periphery, with a reciprocating bed-cutter plate having a pair of complementary bed-cutters arranged to coöperate with their corresponding cutting-cutters, guides or locking-dogs corresponding in number to the cutting-cutters and rotating with the cutter-head, a pair of locking-jaws connected to and moving with said bed-plate and coöperating with said guides or locking-dogs to lock the bed-cutter plate from movement relative to the cutter-head during the cutting operation, a pair of oppositely-disposed impact and return springs adapted to coöperate with the reciprocating mechanism to cushion its strokes and overcome the inertia thereof, means for rotating said cutter-head, and means for reciprocating said bed-cutter plate comprising a rotary cam connected to and moving with the rotating cutter-head.

14. In a machine of the class described, a rotating cutter-head having one or more cutting-cutters on its periphery, spur-gear teeth connected to said cutter-head on its periphery immediately adjacent to the cutters, a bed-cutter coöperating with said cutting-cutters, and a gear-pinion meshing with said gear-teeth immediately in the rear of the bed-cutter to apply power to the cutter-head directly in the rear of the point of resistance.

15. In a machine of the class described, the rotating cutter-head 8 having one or more cutting-cutters 12 on its periphery, the spur-rims 10 secured to the outer edges of the periphery of said cutter-head and immediately adjacent to the cutters, the bed-cutter 13 coöperating with said cutting-cutters, and the gear-pinions 11 meshing with said spur-rims immediately in the rear of the bed-cutter 13 to apply power to the cutter-head directly in the rear of the point of resistance.

16. In a machine of the class described, a rotating cutter-head having one or more cutting-cutters on its periphery, spur-rims of substantially the same diameter as the cutter-head and lying adjacent thereto, interior lugs on the peripheries of said cutter-head and spur-rims, bolts in said lugs to rigidly connect the cutter-head and spur-rim, a bed-cutter coöperating with said cutting-cutters, and gear-pinions meshing with said spur-rims immediately in the rear of the bed-cutters to apply power to the cutter-head directly in the rear of the point of resistance.

17. In a machine of the class described, the combination of the rotating shaft carrying the cutter-head, cutting-cutters mounted on the periphery of the cutter-head, guides or locking-dogs corresponding in number to the cutting-cutters connected to the cutter-head at substantially its periphery, the wheel substantially the diameter of the cutter-head and having the camway on its periphery; with the reciprocating bed-cutter plate having the bed-cutters, a pair of locking jaws and antifriction-rollers all arranged in substantially the same line and coöperating with their complementary parts, substantially as and for the purposes described.

18. In a machine of the class described, the combination of a cutter having outwardly-beveled sides, with a holding member having a channel in which said cutter is placed, adjusting-screws mounted in said holding member and taking against the back of the cutter, and two or more oppositely-disposed retaining-screws mounted in the sides of the channel and coöperating with the beveled sides of said cutters, substantially as described.

19. In a machine of the class described, the combination of the cutter having beveled sides, with a holding member having a channel in which said cutter is placed, two or more oppositely-disposed retaining-screws mounted in the sides of the channel, and locking-dogs having beveled sides coöperating with the beveled sides of said cutters and interposed between said cutters and the retaining-screws, whereby any desired adjustment of the cutter may be obtained, substantially as described.

20. In a machine of the class described, the combination of the cutter having beveled sides, with a holding member having a channel in which said cutter is placed, two or more oppositely-disposed retaining-screws mounted in the sides of the channel, and locking-dogs having beveled sides coöperating with the beveled sides of said cutters and T-shaped heads coöperating with slots in said holding member, said locking-dogs being interposed between the cutter and retaining-screws and all coöperating to secure any desired adjustment of the cutter, substantially as described.

21. In a machine of the class described, the combination of a cutter having beveled sides, with a holding member having a channel in which said cutter is placed, one or more adjusting-screws mounted in said holding member and taking against the back of the cutter, two or more oppositely-disposed retaining-screws mounted in the sides of the channel, and locking-dogs having beveled sides coöperating with the beveled sides of the cutters and interposed between said cutters and retaining-screws.

22. In a machine of the class described, the combination of a cutter having beveled sides, with a holding member having a channel in which said cutter is placed, one or more adjusting-screws mounted in said holding member and taking against the back of the cutter, two or more oppositely-disposed retaining-screws mounted in the sides of the channel, and locking-dogs having beveled sides coöperating with the beveled sides of the cutters and T-shaped heads coöperating with slots in said holding member interposed between said cutter and the retaining-screws.

23. In a machine of the class described, the combination of an L-shaped cutter having a cutter-blade and a shank, with a holding member having a longitudinal slot through which said shank passes and in which it may be adjusted at any desired position by nuts or otherwise, and I-shaped blocks interposed between said shank and the end of the slot, substantially as and for the purpose described.

24. In a machine of the class described, the combination of an L-shaped cutter having a cutter-blade and a shank, with a holding member having a channel in which said cutter-blade is placed and a longitudinal slot through which the shank is passed and in which it may be secured in any desired position by nuts or otherwise, and one or more adjusting-screws mounted in said holding member and taking against the back of the blade of the cutter at its end not adjacent to the shank, substantially as and for the purpose described.

25. In a machine of the class described, the combination of an L-shaped cutter having a cutter-blade with beveled sides and a shank, with a holding member having a channel in which the said cutter-blade is placed and a longitudinal slot through which the shank is passed and in which it may be secured in any desired position, one or more adjusting-screws mounted in said holding member and taking against the back of the cutter-blade and two or more oppositely-disposed retaining-screws mounted in the sides of the channel and coöperating with the beveled sides of said cutter-blade, substantially as described.

26. In a machine of the class described, the combination of an L-shaped cutter having a cutter-blade with beveled sides and a shank, with a holding member having a channel in which said cutter-blade is placed and a longitudinal slot through which the shank is passed and in which it may be secured in any desired position, one or more adjusting-screws mounted in said holding member and taking against the back of the cutter-blade, two or more oppositely-disposed retaining-screws mounted in the sides of the channel, and locking-dogs having beveled sides coöperating with the sides of the cutter-blade and disposed between said blade and the retaining-screws, substantially as described.

27. In a machine of the class described, the combination of an L-shaped cutter having a cutter-blade with beveled sides and a shank, with a holding member having a channel in which said cutter-blade is placed and a longitudinal slot through which the shank is passed and in which it may be secured in any desired position, one or more adjusting-screws mounted in said holding member and taking against the back of the cutter-blade, two or more oppositely-disposed retaining-screws mounted in the sides of the channel, and locking-dogs having beveled sides coöperating with the sides of the cutter-blade and T-shaped heads coöperating with slots in said holding member, said dogs being interposed between the cutter-blade and the retaining-screws.

28. In a machine of the class described, the combination of two cutters having beveled sides, with a holding member having a channel in which said cutters are placed side by side, two or more oppositely-disposed retaining-screws mounted in the sides of the channel, a dovetailed longitudinal slot in said holding member between said cutters, and a dovetailed locking-block in said dovetailed slot coöperating with the adjacent beveled edges of said cutters and through them with the retaining-screws, substantially as described.

29. In a machine of the class described, the combination with a moving part of the nail-cutting mechanism, of the nail-feeding mechanism comprising a pair of feed-rollers between which the nail-strip passes, connections between said moving part and the feed-rollers whereby they are operated to feed the strip faster than the cutting mechanism can consume it, and a spring interposed between the said feed-rollers and said connections, for the purpose described.

30. In a machine of the class described, the combination with a moving part of the nail-cutting mechanism, of the nail-feeding mechanism comprising a pair of feed-rollers between which the nail-strip is passed, connections between said moving part and the feed-rollers comprising two adjacent disks one connected to one of the feed-rollers and the other operated by said connections, and a spring mounted between said disks and put under tension as said connections are operated to move said feed-rolls faster than the cutting mechanism can consume the nail-strip, for the purpose described.

31. In a machine of the class described, the combination with a moving part of the nail-cutting mechanism, of the nail-feeding mechanism comprising a pair of feed-rollers between which the nail-strip is passed, connections between said moving part and the feed-rollers comprising two adjacent disks one connected to one of the feed-rollers and the other operated by said connections and each of said disks having an annular groove in one surface, which grooves taken together form an annular channel, and an expanding helical spring confined in said annular channel between lugs projecting from said disks, substantially as and for the purpose described.

32. In a machine of the class described, the combination of a moving part of the nail-cutting mechanism, of the nail-feeding mechanism, and adjustable connections between said moving part and the nail-feeding mechanism whereby the rate of feed relative to the movement of the cutting mechanism may be varied, comprising the longitudinally-slotted tappet-bearing plates $n^4$, and the bolts $n^5$ coöperating with the slots for the purposes of adjustment.

33. In a machine of the class described, the combination with a moving part of the nail-cutting mechanism, of the nail-feeding mechanism, and connections between said moving part and the nail-feeding mechanism comprising a lever and a pair of lugs on the moving part adjustable so as to vary the amount of lost motion between them and the lever, whereby the rate of feed relative to the movement of the cutting mechanism may be varied.

34. In a feeding mechanism for a machine of the class described, the combination of a pair of feed-rolls, a disk connected with one of said rolls having a rim thereon, with a reciprocating operating-pawl having pivoted dogs taking on opposite sides of the rim of the disk and operating to clutch it to move it during its reciprocation in one direction, and not in the other.

35. In a machine of the class described, the combination with a moving part of the nail-cutting mechanism, of the nail-feeding mechanism comprising a pair of feed-rollers, a disk connected with one of said rolls having a rim thereon, a reciprocating operating-pawl having pivoted dogs taking on opposite sides of the rim of the disk, and operating to clutch it to move it during its reciprocation in one direction, and not in the other, and adjustable connections between said moving part and the reciprocating operating-pawl, whereby the rate of feed relative to the movement of the cutting mechanism may be varied.

36. In a machine of the class described, the combination with the bed-cutter, of the rotating cutter-head carrying a plurality of cutting-cutters 12, means for feeding a strip to be cut between the bed and cutting cutters, and an unyielding adjustable gage comprising the curved strips extending from the nose of one cutting-cutter to the shank of the adjacent cutter, for the purpose described.

37. In a machine of the class described, the combination with a bed-cutter, of a rotary cutter-head carrying a plurality of adjustable cutting-cutters arranged on the periphery, means for feeding the strip to be cut between the bed and cutting cutters, and an adjustable gage comprising the strip 27 carried by the adjustable thimble 44, for the purpose described.

38. In a machine of the class described, the combination with a bed-cutter, of a rotary cutter-head carrying a plurality of adjustable cutting-cutters arranged on the periphery, means for feeding the strip to be cut between the bed and cutting cutters, and an adjustable gage comprising the strips 27 and 28 adjustable relative to each other to extend between the shank of one cutter and the nose of the adjacent cutter in whatever position the cutters may be adjusted, for the purpose described.

39. In a machine of the class described, the combination with the bed-cutter, of a rotary cutter-head carrying a plurality of adjustable cutting-cutters arranged on the periphery, means for feeding the strip to be cut between the bed and cutting cutters, and an adjustable gage comprising the strips 27 and 28 adjustable relative to each other to extend between the shank of one cutter and the nose of the adjacent cutter in whatever position the cutters may be adjusted, and adjustable to and from the center of the cutter-head to vary the depth of the cut, substantially as and for the purpose described.

40. In a machine of the class described, the combination with a bed-cutter, of a rotating cutter-head comprising a plurality of adjustable cutting-cutters coöperating with said bed-cutter, means for feeding the strip to be cut between said bed and cutting cutters, and a gage comprising the strips 27 and 28 longitudinally slotted so that they may be extended from the nose of one cutter to the shank of the adjacent cutter in whatever position the cutters may be adjusted.

41. In a machine of the class described, the combination of the bed-cutter, with the cutting-cutter coöperating therewith, the angular relation between the cutters at the instant of the cut being unchanged, means for feeding the nail-strip between said cutters comprising the supports $35^a$, the slotted plates 47 having pivotal connections with said support about the nose of the bed-cutter as a center, and the screw $s$ mounted in the support $35^a$ and taking against the slotted plates 47, and having the check-nuts $s^2$ coöperating with the support to secure the slotted plates 47 in any desired position.

42. In a feeding mechanism for a machine of the class described, the combination of the support $35^d$, the bed-cutters 13 having a fixed relation to said support, with the slotted plates 47, pivotal connections between the plates 47 and the support $35^a$ comprising the segmental slotted member $47^b$ attached to the plates 47 and coöperating with the stud $t^2$ secured to a portion of the framework which is fixed in relation to the support $35^a$, and means for raising and lowering the outer ends of the plates 47 relative to said support.

43. In a feeding mechanism for a machine of the class described, the combination of the support $35^a$, the bed-cutters 13 having a fixed relation to said support, with the slotted plates 47, pivotal connections between the plates 47 and the support $35^a$ comprising the segmental slotted member $47^b$ attached to the plates 47 and coöperating with the stud $t^2$ secured to a portion of the framework which is fixed in relation to the support $35^a$, and the segmental bearing-surface $47^a$ formed on the plates 47 coöperating with correspondingly-shaped fixed bearing, and means for raising and lowering the outer ends of the plates 47 relative to said support.

44. In a feeding mechanism for a machine of the class described, the combination of the support $35^a$, the bed-cutters 13 having a fixed relation to said support, with the slotted plates 47, pivotal connections between the plates 47 and the support $35^a$ comprising the segmental bearing-surfaces $47^a$ and the block $u$ having the wings $u'$ coöperating with said segmental bearing-surfaces, and means for retaining the block $u$ in position, and means for raising and lowering the outer ends of the plates 47.

45. In a feeding mechanism for a machine of the class described, the combination of the support $35^a$, the bed-cutters 13 having a fixed relation to said support, with the slotted plates 47, pivotal connections between the plates 47 and the support $35^a$ comprising the segmental bearing-surfaces $47^a$ and the block $u$ having the wings $u'$ coöperating with said segmental bearing-surfaces, the plates $t$ secured to the framework of the machine and coöperating with the wings $u'$ to retain the block $u$ in position, and means for adjusting the outer ends of the plates 47 relative to the support $35^a$.

46. In a feeding mechanism for a machine of the class described, the combination of the support $35^a$, the bed-cutters 13 having a fixed relation to said support, with the slotted plates 47, pivotal connections between the plates 47 and the support 35ª comprising the segmental bearing-surfaces 47ª and 47ᵇ, the studs $t^2$, the block $u$ having the wings $u'$ coöperating with the bearing-surfaces 47ª, and the plates $t$ carrying the studs $t^2$ and having the apertures $t^3$ coöperating with the wings $u'$, and means for adjusting the outer ends of the plates 47 relative to the support 35ª.

W. N. SEVERANCE.

Witnesses:
ALLAN A. MURRAY,
LOUISE E. SERAGE.